United States Patent [19]

Schuhmacher

[11] 4,397,319
[45] Aug. 9, 1983

[54] CLEANING DEVICE FOR HARVESTING MACHINES

[75] Inventor: Ernst Schuhmacher, Homburg-Einod, Fed. Rep. of Germany

[73] Assignee: Deere & Company, Moline, Ill.

[21] Appl. No.: 249,582

[22] Filed: Mar. 31, 1981

[51] Int. Cl.³ .................... A01F 12/48; A01F 7/00
[52] U.S. Cl. ....................... 130/27 HF; 130/27 M; 130/27 Z
[58] Field of Search ............ 56/13.3, 14.6, 16.5; 130/27 Z, 27 M, 27 Y, 27 HF

[56] References Cited

U.S. PATENT DOCUMENTS

| | | |
|---|---|---|
| 1,884,151 | 10/1932 | Nye .................................. 130/27 M |
| 1,907,344 | 5/1933 | Climer . |
| 2,905,182 | 9/1959 | Wise ..................................... 130/27 |
| 2,974,668 | 3/1961 | Witzel ............................... 130/27 M |
| 3,315,449 | 4/1967 | Morrison et al. ...................... 56/14.6 |
| 3,808,780 | 5/1974 | Wood .................................. 56/14.6 |
| 3,833,006 | 9/1974 | Temple ........................... 130/27 HF |
| 4,303,079 | 12/1981 | Claas et al. ....................... 56/16.5 X |

FOREIGN PATENT DOCUMENTS 2011028 4/1971 Fed. Rep. of Germany .
2030564 11/1970 France .

*Primary Examiner*—Robert P. Swiatek
*Assistant Examiner*—Robert A. Hafer

[57] ABSTRACT

In a cleaning device for threshed crop material, the material is introduced into the upstream end of a drum by a coaxial auger feeder. An air flow whirling around the inner wall of the drum is created by a tangentially connected blower. Heavier fractions of the crop material (grain) tend to be flung against the drum wall and leave through grates into a closed conveyor system, creating dynamic air pressure in the drum. Chaff and straw tend to be held in vortex towards the central core of the drum and are discharged axially through the downstream end of the drum. Various alternative embodiments with multiple blowers, multiple air inlets into the drum, recirculation of the cleaning air, finger rakes in various dispositions inside the drum, crop material fed through the blower delivery duct and adjustable baffles for controlling air flow entering the drum are described.

23 Claims, 13 Drawing Figures

FIG. 11
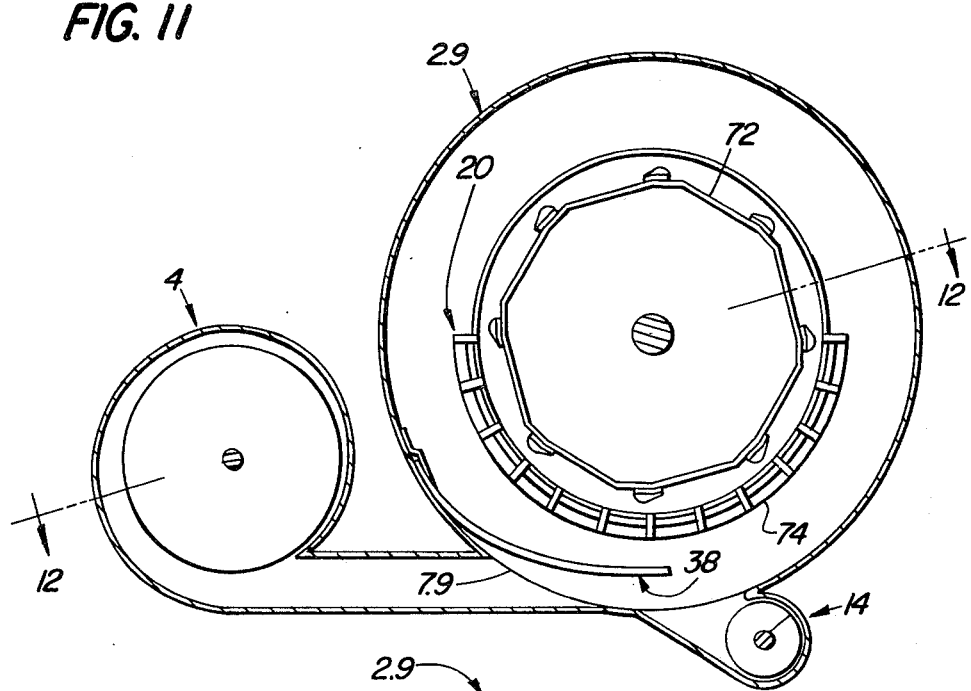
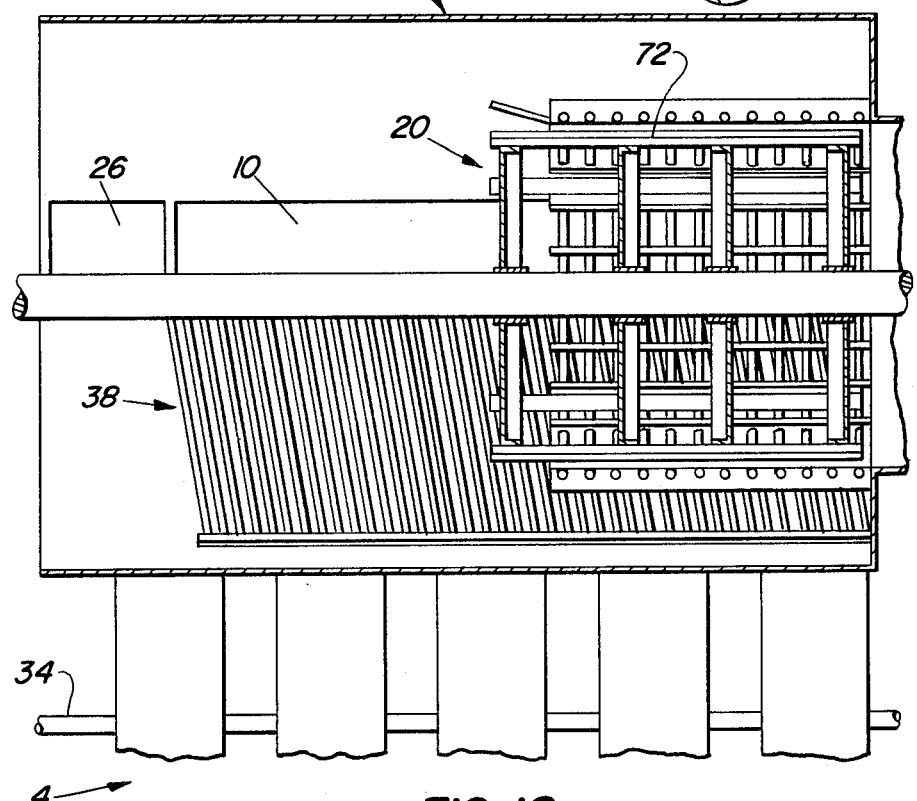
FIG. 12

CLEANING DEVICE FOR HARVESTING MACHINES

BACKGROUND OF THE INVENTION

This invention relates to a cleaning device for harvesting machines wherein a blower provides cleaning air, which is conveyed into a drum and which separates the harvested crops from impurities, the harvested crops being discharged through sieve-like outlets provided in the cleaning drum.

One known cleaning device, disclosed in U.S. Pat. No. 3,315,449 Morrison et al, is provided at the end of a threshing and separating drum and is formed of a sieve-like housing in which there is provided a rotatably mounted conveying element which keeps the harvested crops and the impurities moving in the housing, the cleaning housing being subjected to air by way of a blower so that the impurities can be separated from the harvested crops. The blower is, in this case, connected to the cleaning housing in such a way that the cleaning air is conveyed radially inwards through the grate of the housing. This configuration does not readily provide desired levels of capacity and efficiency.

SUMMARY OF THE INVENTION

It is an object of the present invention to separate the threshed crop material, such as grain, from the impurities by centrifugal action assisted by a particular air flow arrangement.

According to the present invention, there is provided a cleaning device for harvesting machines comprising a cleaning drum, a feeder for feeding threshed material into the drum and a blower for subjecting the cleaning drum to cleaning air which is conveyed into the drum through at least one inlet and which separates the harvested crops from impurities, the harvested crops being discharged through at least one sieve-like outlet provided in the cleaning drum, the blower delivery being approximately tangentially connected to the cleaning drum in such a way that the cleaning air is conveyed, with the harvested crops, along the closed inner wall of the cleaning drum, the cleaned harvested crops being discharged through outlet(s) which are provided on the wall of and/or at the end of the cleaning drum. Since the cleaning air is conveyed tangentially into the cleaning drum, the material mixture of harvested crops and impurities is caused to rotate and in this case is moved mainly along the inner wall of the cleaning drum. An artificial force field is created hereby, and the heavier parts, i.e. the harvested crops, are forced outwards against the inner wall of the cleaning drum, whilst the lighter parts, namely the impurities, move more towards the center of the cleaning drum. In this way, it is possible for the harvested crops to be discharged through the outlet or outlets provided on the wall of the cleaning drum. This arrangement therefore prevents the discharge of impurities through the outlets since the impurities are discharged from the cleaning drum mainly in the axial direction. In this case, it is advantageous that the outlet for the cleaned harvested crops is in effect sealed by a device so that a dynamic pressure is generated, and that the device generating the dynamic pressure is a conveying device for receiving the cleaned harvested crops. The device which generates the dynamic pressure is intended to prevent the cleaning air from being able to escape together with the harvested crops rather than discharging impurities. This device, therefore, ensures that the harvested crops are moved by centrifugal means along the inner wall of the cleaning drum and are only discharged through the outlet after the impurities are separated from the crops. By relying on air for conveying of material, structure is simplified (rotors and paddles, for example, are eliminated) and mechanical damage of harvested crops may be reduced. Axial movement of the crop material in the drum may be induced by means such as helical guide vanes on the drums inner surface or guidance of suitably angled auxiliary separating structures within the drum.

In accordance with a further feature of the invention, it is advantageous that the outlet, with respect to the axial conveying direction, lies directly behind the inlet of the blower, and that the width of one blower or of a plurality of blowers arranged side-by-side is to some extent equal to the length of the cleaning drum. In this way, it is ensured that the harvested crops must pass, together with the impurities, through the entering stream of cleaning air so that the lighter parts can then be blown off towards the interior, whilst the heavier parts can be discharged towards the exterior.

Moreover, it is advantageous that the outlet can be divided into sections by means of a separating device through which harvested crops, which have been cleaned to varying degrees, can be fed to various conveying devices, and that the second outlet, which is formed by means of the separating device, is provided, relative to the conveying direction of the harvested crops, in the rear section of the cleaning drum or in an extension of the cleaning drum. It is ensured by means of the separating device that harvested crops, which have been cleaned to varying degrees, can be fed to various conveying devices, it being possible for the harvested crops, which have been cleaned to a lesser degree, to be fed back to the cleaning device. Moreover, it is advantageous that the end of the feeder for the harvested crops is situated in the front section of the cleaning drum, the outlet of the cleaning drum is covered or shielded by a device having longitudinal orifices, and that the device may be in the form of a finger rake, the tines of which form an angle to the plane which extends in the flow direction of the air. Moreover, it is advantageous that the finger rake is curve-shaped and designed so as to be adjustable, and that the tines of the finger rakes are spaced from one another by a variable distance. Moreover, it is advantageous that the finger rake is detachably connected to the cleaning drum. Using the finger rake, mechanical separation supplements pneumatic separation. A plurality of finger rakes, circumferentially spaced, may be provided on the inner wall of the cleaning drum, the said rakes being spaced, at their delivery ends, from the inner wall of the cleaning drum.

In accordance with a further feature of the invention, at least one adjustable guide device may be provided within the cleaning drum in the area of the pressure connection of the cleaning blower, and that the device for conveying the cleaned harvested crops comprises, in the area of its inlet connection, an adjustable guide device, the front end of which can be pivoted into the cleaning drum. The adjustable guide device ensures that the impurities are conveyed more or less towards the inner area of the cleaning drum, depending on the condition of the harvested crops. In this case, it is advantageous that at least two blowers, spaced at intervals from one another, or groups of blowers are distributed on the circumference of the cleaning drum. Moreover, it is advantageous that the cleaning drum comprises a plurality of inlets distributed on the circumference thereof and is at least partially surrounded by an outer, closed jacket which forms an annular channel, the annular channel being connected by its air inlet to at least one blower, that a finger rake is associated with each inlet, the finger rake above the outlet being larger than the other finger rakes, and that the adjustable guide device is provided on the annular channel in the area of its air outlet. Moreover, it is advantageous that the inlet for the cleaning air is provided with the largest inlet cross-section and the outlet for the cleaned harvested crops is provided in the upper section of the cleaning drum.

In accordance with a further feature of the invention, the feeder for the harvested crops may be mounted coaxially with the cleaning drum and is followed by a rotary conveying device which comprises blades and which is mounted concentrically with the feeder. Because of the additional arrangement of a further rotary conveying device, which can be installed in the system after, for example, a screw conveyor, the harvested crops are also caused to rotate in the cleaning drum by mechanical means in a simple manner. In this case, it is advantageous that the feeder is connected by its outlet connection to the pressure connection of the blower, the outlet connection lying relative to the conveying direction in the cleaning drum, in a transverse plane which extends through the front part of the cleaning drum.

In accordance with a further feature of the invention it is advantageous that a threshing and separating device, which extends coaxially with the cleaning drum, runs into the front section of the said drum. The entire device has a more compact construction because the cleaning device is mounted coaxially with the threshing and separating device.

Moreover, it is advantageous that the finger rake extends over the entire width of all the outlets for the cleaned harvested crops and at least partially covers the outlets in the conveying direction of the harvested crops, and that the blower is connected, relative to the conveying direction of the harvested crops to the end of the cleaning drum by a suction connection, the pressure connection of the said blower being connected to the annular channel. It is also advantageous that the outlet for impurities is provided on the wall of the cleaning drum, and that the suction connection of the blower extends coaxially with the cleaning drum. Owing to the coaxial arrangement of the blower at the end of the cleaning drum, the power input can be reduced since a rotary motion has already been imparted to the cleaning air entering the blower. Moreover, it is then advantageous that the impurities at the end of the cleaning drum are discharged laterally.

BRIEF DESCRIPTION OF THE DRAWINGS

FIG. 11 shows, in cross section, a ninth embodiment of the invention in which a threshing and separating device is partly integrated into the cleaning drum.

FIG. 12 shows a cutaway plan view of the cleaning device according to FIG. 11, taken approximately on line 12—12 of FIG. 11.

DESCRIPTION OF THE PREFERRED EMBODIMENTS

In this description, the same basic number is used to identify functionally similar elements appearing in more than one embodiment, using a suffix to differentiate one embodiment from another.

Figures 1, 2:
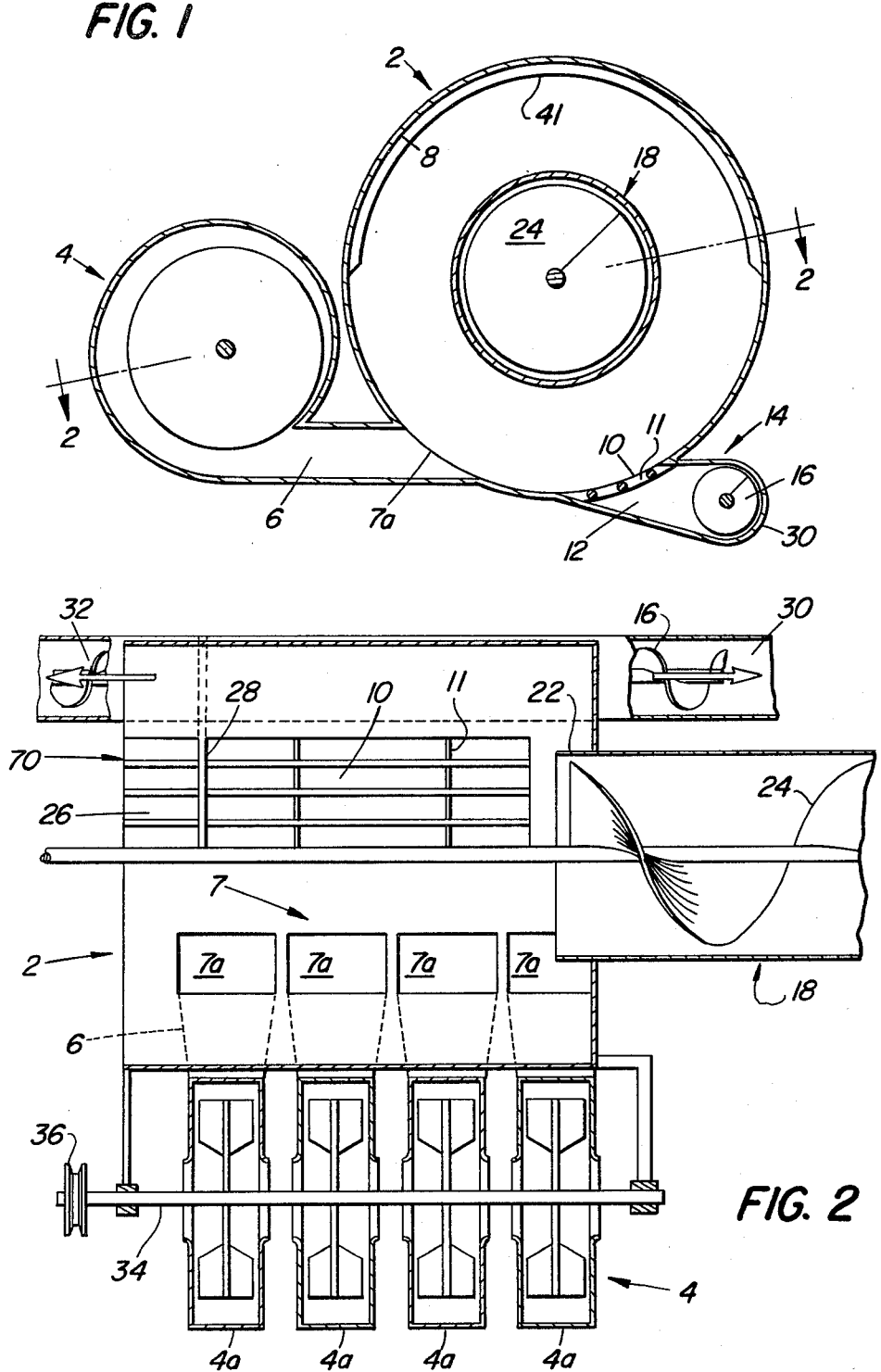
FIG. 1 shows a diagrammatic cross-section of a cleaning device according to the invention.
FIG. 2 shows a cutaway plan view of the cleaning device of FIG. 1, approximately on line 2—2 of FIG. 1.

FIG. 1 illustrates, in diagrammatic cross section, a cleaning device for a harvesting machine, such as a combine harvester, according to the invention.

In this embodiment, the cleaning drum 2 is shown as cylindrically shaped but it may also be oval in cross section or conical. A blower assembly 4 is connected tangentially to the lower wall of the cleaning drum 2 via a pressure connection or delivery duct 6. In this way, the cleaning air emerging from the pressure connection 6 is conducted into the cleaning drum 2 through an inlet 7 provided in the wall of the cleaning drum 2 and then moves tangentially along the inner wall 8 of the cleaning drum 2, the harvested crops also being conveyed along with the impurities. Circumferentially spaced from the inlet 7 in the cleaning drum wall is a lateral outlet 10 to which an inlet connection 12 of a conveying device 14, such as the auger conveyor shown, is connected. The conveying device 14 receives the cleaned crop material and the screw conveyor 16 may carry the harvested crops directly or indirectly to a storage tank (not shown in the drawing). The threshed material (which is delivered, for example, from a threshing and separating device of the type indicated at 20 in FIGS. 11 and 12), passes from a feeder 18 into the drum 2 through an outlet 22. As shown in FIG. 2, the feeder 18 is equipped with an auger conveyor 24 which extends coaxially with the cleaning drum 2 and, as a result, delivers the harvested crops to the center of the end of the cleaning drum. Another form of feeding conveyor, such as chain and slat, may of course be used in place of the auger 24.

The cleaning drum 2 comprises, in addition to the first or clean grain outlet 10, a second or tailings outlet 26 (seen best in FIG. 2) which is separated from the first outlet 10 by means of a separating device, for example a partition 28. As indicated schematically in FIGS. 1 and 2 only, the outlets 10 and 26 may be spanned by a suitably sized sieve-like or grate structure 11. This structure 11 as well as resistance to exiting air offered by other elements such as the loaded conveyors 14 and 18 tends, dynamically, to increase air pressure in the drum 2. The outlet 10 provides access to the conveyor housing 30 and the outlet 26 provides access to the conveyor housing 32. The conveyor housing 30 can be connected to the storage tank, whilst the conveyor housing 32 can be connected to the housing of the threshing and separating device 20. In this way, the harvested crops which have been only partially cleaned or tailings are fed back to the cleaning device.

The blower assembly 4 may consist of a plurality of side-by-side coaxial blower units 4a as shown in FIG. 2. The blower units 4a are mounted on a drive shaft 34 and driven by means of a V-belt pulley 36. Each blower unit 4a is connected to an inlet portion 7a of the inlet 7 which is provided on the wall of the cleaning drum 2. Chaff and other impurities are entrained by the air delivered by the blowers and moved tangentially and axially along the inner wall 8 until they pass out of the cleaning drum 2 through an opening 70 at its downstream end.

Figure 3:
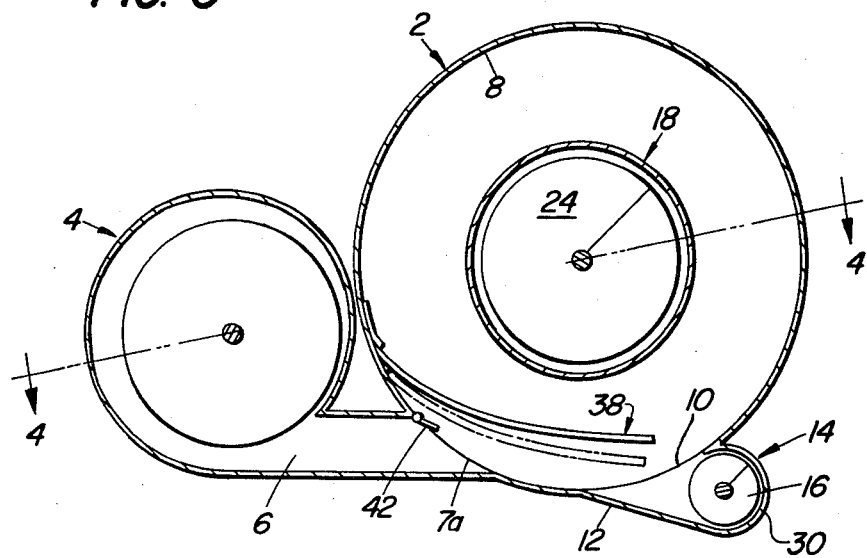
FIG. 3 shows a second exemplary embodiment of the cleaning device in diagrammatic cross section.
Figure 4:
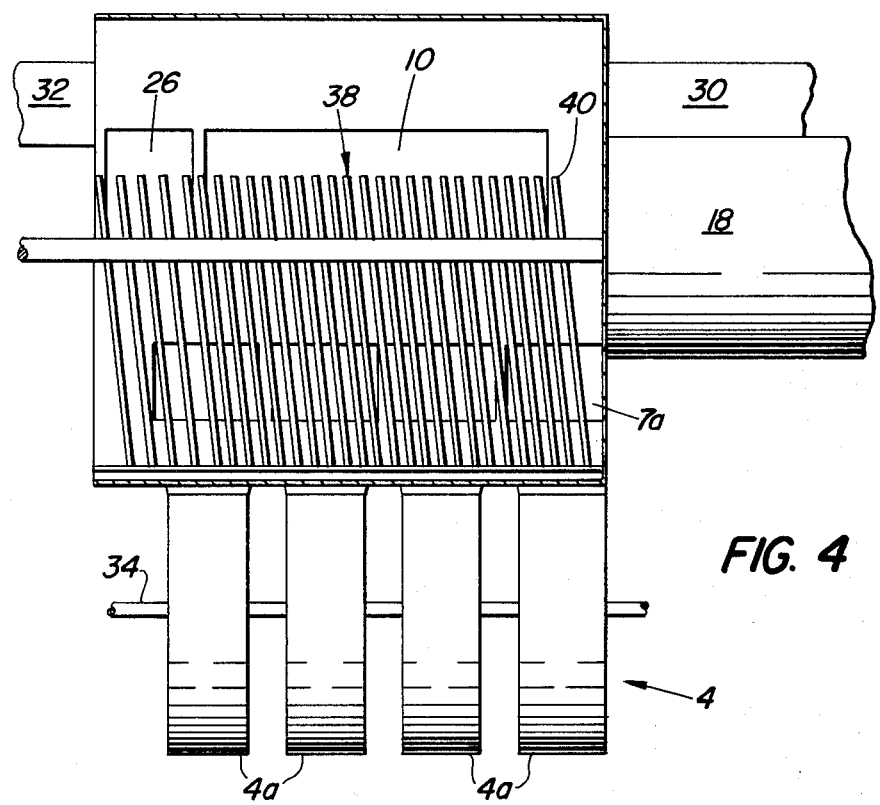
FIG. 4 shows a cutaway plan view of the cleaning device according to FIG. 3, taken approximately on line 4—4 of FIG. 3.

As indicated in FIG. 3, in a second embodiment, the inlet portions 7a can be overlaid at least partially by a sieve-like grill (not shown in the drawing) or by a finger rake assembly 38, either exemplary form constituting an auxiliary separating structure. The finger rake assembly 38 has a large number of tines 40 arranged side-by-side and extending parallel to one another, it being possible to have a variable spacing between the said tines. The widest spacing between the tines 40 occurs in the area above the second outlet 26 so that ears of grain, which have not been threshed or which have only been partially threshed, can be discharged more efficiently, said ears of grain then being fed back to the cleaning device by way of the return conveyor 32. The tines 40 shown in FIG. 4 form an acute angle relative to the transverse plane which intersects the cleaning drum 2 so that the harvested crops which have been conveyed over the inner wall 8 of the cleaning drum 2 and onto the rake assembly 38 are also deflected laterally. This ensures that the harvested crops and conveyed more efficiently to the end of the cleaning drum 2. As an alternative to, or in addition to, the finger assembly 38 other axially displacing means, such as the helically disposed guide vanes 41, shown only in FIG. 1, may be provided. The entire surface area of the finger rake assembly 38 covers the entire area of the inlet portions 7a, and, at least partially, the outlets 10 and 26. The coarser impurities of the harvested crops, for example pieces of straw, are thereby deflected from the outlets 10 and 26 so that they are not discharged into the clean grain or tailings conveyors. The finger rake assembly 38 may be made radially adjustable with respect to the wall of the drum 2 as indicated in FIG. 3.

Figure 5:
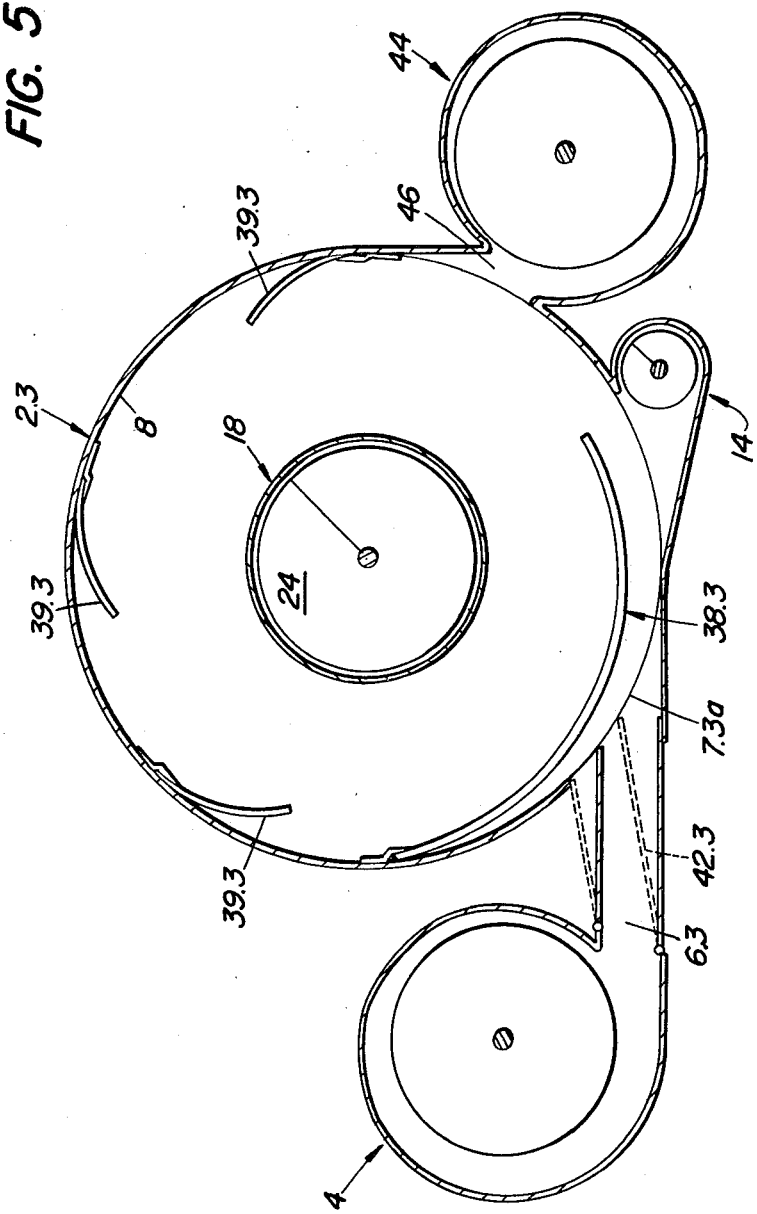
FIGS. 5 and 6 show a third and fourth exemplary embodiments of cleaning devices according to the invention, in diagrammatic cross sections.

As shown in FIG. 3 and in a third embodiment in FIG. 5, the respective pressure connection 6, 6.3 respectively of the blower units 4a may be equipped with an adjustable or pivotable guide device 42, 42.3 respectively which influences the direction in which the cleaning air flowing out of the blower is injected. For example, the impurities in the harvested cleaning air may be given a more radial component when crop condition requires it.

In the variation shown in FIG. 5, it is possible to provide, relative to the direction of rotation, a plurality of shorter additional finger rake elements 39.3 arranged at intervals from one another on the inner wall 8 of the cleaning drum, which finger rakes point inwards with their free ends and thereby guide coarser impurities of the harvested crops into the central area of the cleaning drum and also produce an agitating effect in the mixture of crops and impurities, whereby the grain kernels can be better shaken out of the straw layer. The overall length of the finger rakes 39.3 is (in this case) less than the overall length of the finger rake 38.3 above the inlet 7.3a. Moreover, it is possible to provide, in addition to the first blower assembly 4, a second twin or supplementary blower assembly 44 which is approximately on a level with the first blower 4 and connected tangentially to the wall of the cleaning drum 2 by a pressure connection 46.

Figure 6:
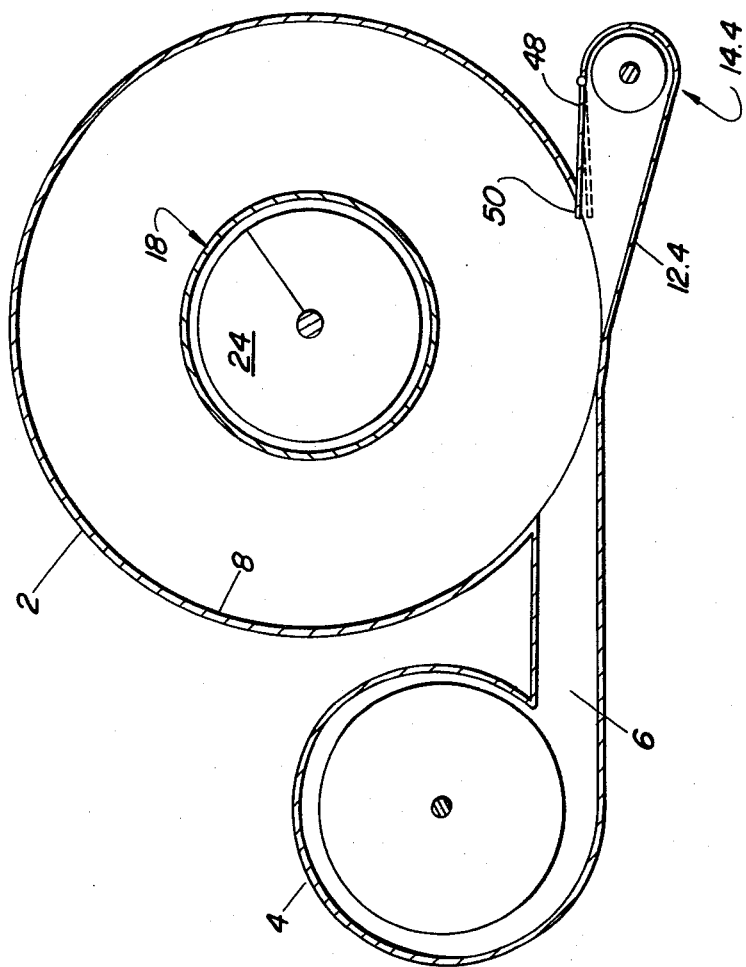

In accordance with a fourth exemplary embodiment shown in FIG. 6, the inlet connection 12.4 of the conveying device 14.4 is equipped with a pivotable guide device or deflector 48 which, when in certain positions, may extend with its front end 50 into the cleaning drum 2. The adjustable deflector 48 may be moved outwards to divert and exclude a relatively greater percentage of trash from the "clean" grain entering the clean grain conveyor 14.4, to suit varying crop and operating conditions.

Figure 7:
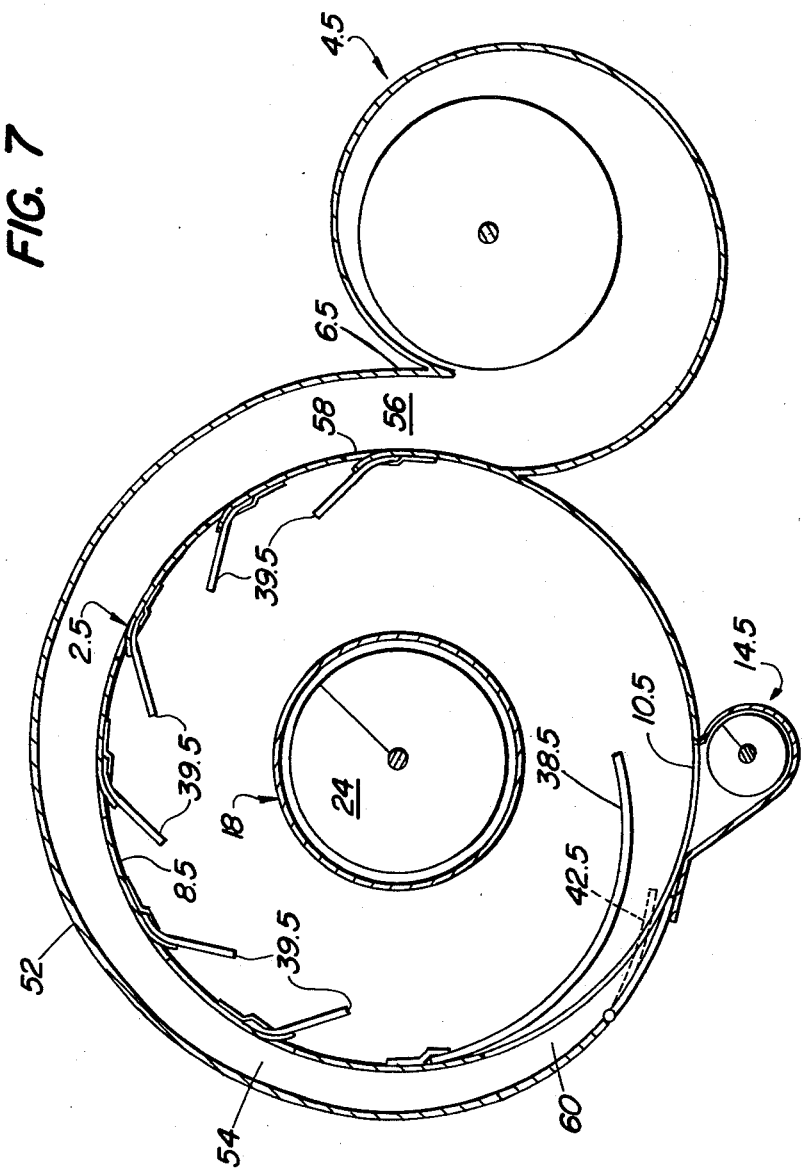
FIG. 7 shows in diagrammatic cross section of a fifth exemplary embodiment of the invention having a plurality of finger elements distributed over the inner surface of the cleaning drum.

In accordance with a fifth exemplary embodiment shown in FIG. 7, the cleaning drum 2.5 may be surrounded by an outer casing 52 which forms, with the outer surface of the cleaning drum 2.5, an annular channel 54 which is connected by its air inlet 56 to the blower 4.5. A number of inlets 58 are circumferentially spaced around the upper portion of the drum 2.5, each associated with an inwardly extending finger rake 39.5. Entry of air through the inlets 58 increases agitation of the crop material as it is conveyed through the drum 2.5. The annular channel 54 tapers and ends at the inlet 10.5 of the conveyor 14.5. Adjacent the outlet 60 of the annular channel 54 there can be provided a deflector or guide device 42.5 for controlling the direction of the air entering the drum 2'.

Figure 8:
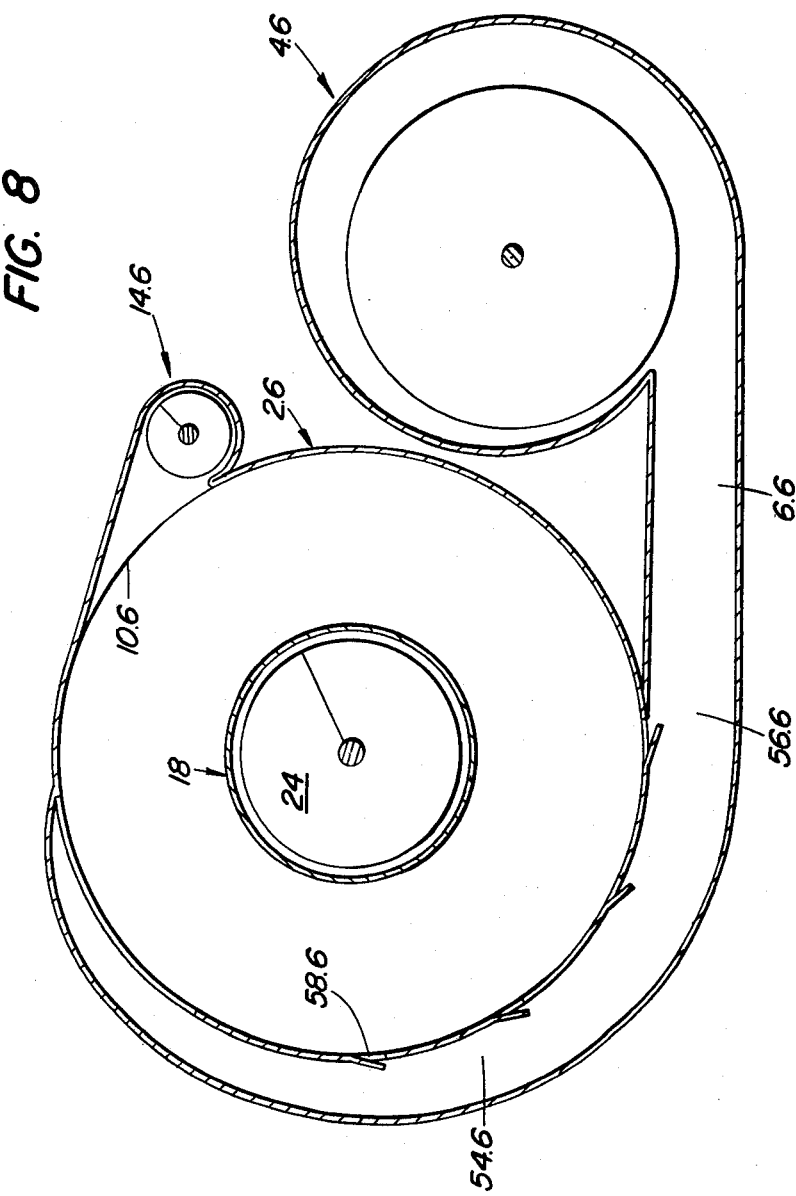
FIG. 8 shows, also in diagrammatic cross section, a sixth exemplary embodiment having an auger conveyor situated in the upper area of the cleaning device, for conveying cleaned harvested crops.

In a sixth exemplary embodiment according to FIG. 8 the conveyor 14.6 is disposed near the top of the cleaning drum 2.6 and the air inlet 56.6 of the annular channel 54 is approximately diametrically opposite the inlet 10.6 to the conveyor device 14.6.

Figure 9:
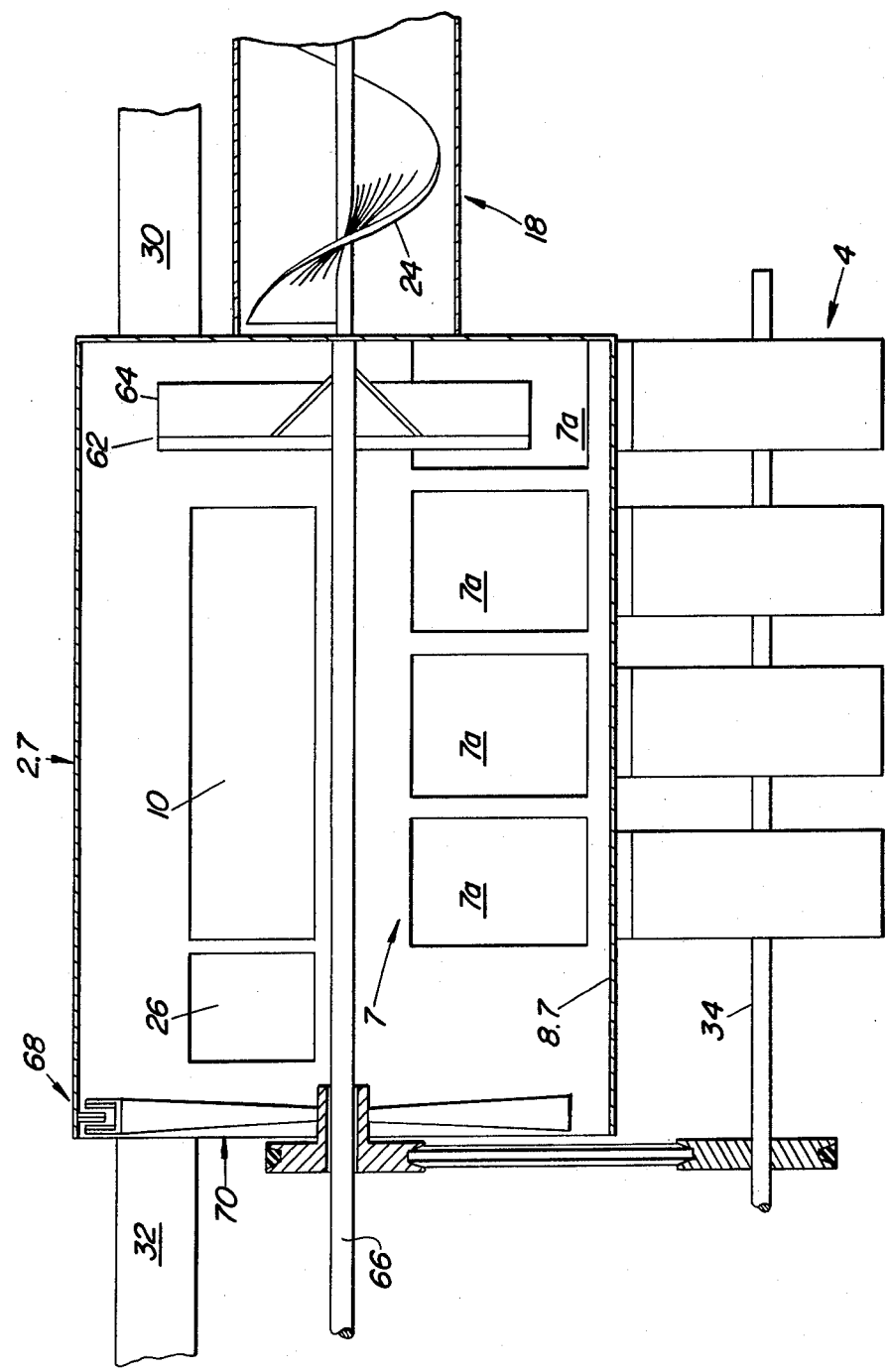
FIG. 9 shows in cutaway plan view a seventh exemplary embodiment including an impeller in the feeding device.

In a seventh embodiment shown in FIG. 9, the feeder conveyor 18 is mounted coaxially with the cleaning drum 2.7 and a common shaft 66 extending through the drum 2 carries at the upstream end of the drum, adjacent the outlet from the conveyor 18, an additional rotary conveying device or impeller 62 which is provided with blades 64. The impeller 62 accelerates the entering crop material into circumferential motion along the inner surface 8.7 of the cleaning drum and a less powerful blower 4 can be used as it is required only to maintain the material in motion. At the downstream end of the cleaning drum 2.7, an independently driven straw chopper 68, also functions as an axial flow conveyor for chopping the straw and ejecting it through the axial outlet 70 of the cleaning drum 2.7. The diameter of the outlet 70 is approximately equal to that of the cleaning drum 2.7.

Figure 10:
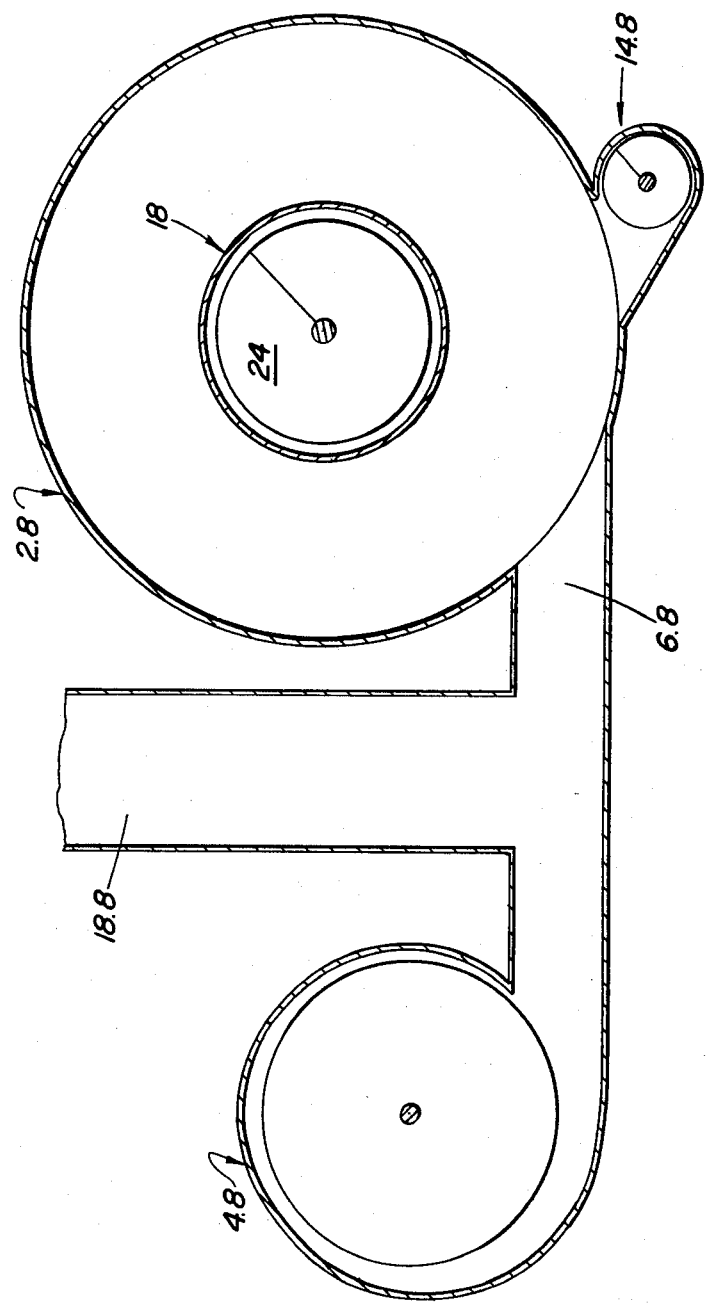
FIG. 10 shows, in diagrammatic cross section, an eighth embodiment in which the feeding device delivers into the blower delivery duct.

In an eighth embodiment (FIG. 10), the feeder 18.8 delivers into the blower delivery duct 6.8 and crop material is conveyed into the cleaning drum 2.8 entrained in the cleaning air.

In a ninth embodiment shown in FIGS. 11 and 12, a threshing and separating device 20 coaxial with the drum 2.9 is mounted in the upstream end of the drum, resulting in a very compact combination, with material threshed between threshing cylinder 72 and concave 74 delivered directly to the cleaning drum 2.9 from the grate 74.

Figure 13:
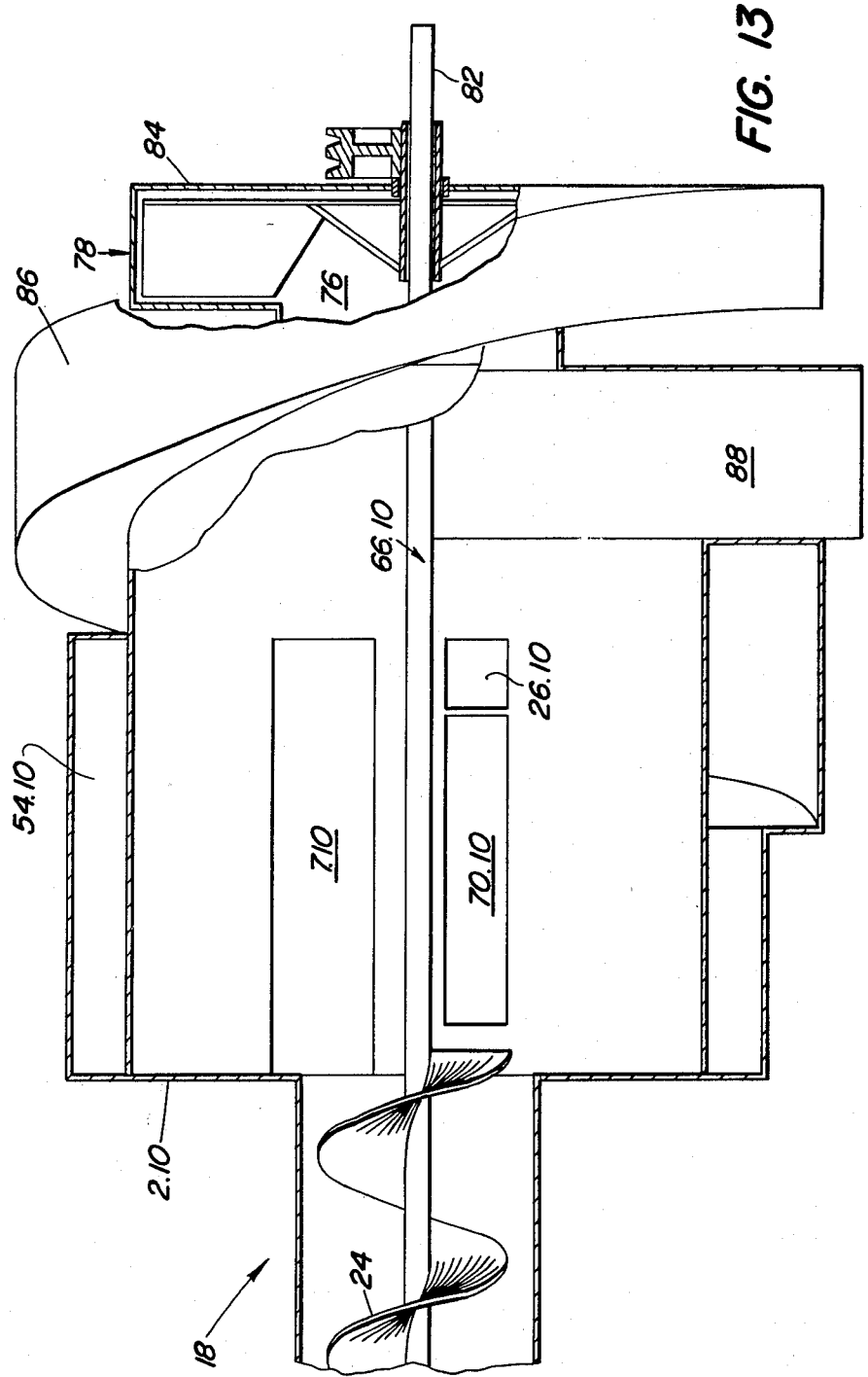
FIG. 13 shows, in a cutaway plan view similar to FIG. 12, a tenth embodiment of the invention in which the cleaning blower is mounted at the end of and coaxially with the cleaning drum.

In a tenth embodiment shown in FIG. 13, a suction connection or inlet 76, to a blower 78, is connected to the downstream end of the cleaning drum 2. The blower 78 is preferably of the centrifugal flow type and is driven via a shaft 82 coaxial with the shaft 66.10. Air delivery from the blower 78 is via a housing 84 and a duct 86 which extends helically around the cleaning drum 2.10 and is connected to an annular channel 54.10 (similar to that of FIG. 8) and through the inlet 7.10 into the drum 2. This closed system, recirculating the cleaning air, reduces the power requirement of the cleaning device. Since the cleaning air is already rotating when it passes out of the cleaning drum 2.10 into the suction connection 76, a smaller proportion of acceleration energy must be imparted to the cleaning air. In this configuration, trash is discharged circumferentially through an outlet 88 at the downstream end of the cleaning drum 2.10.

We claim:

1. In a harvesting machine, a crop material cleaning device for processing threshed material comprising:
   a fixed cleaning drum having an upstream threshed material inlet and a downstream outlet and a generally cylindrical wall including an air inlet including an air inlet portion adjacent and generally downstream of the threshed material inlet and a sieve-like outlet;
   a feeder conveyor in a crop material delivery relationship with the upstream inlet for feeding threshed material into the drum;
   a blower assembly connected to the air inlet for delivering a flow of air into the drum in a direction substantially tangential to the wall of the drum adjacent the air inlet for engaging the threshed material and propelling it circumferentially within the drum; and
   means urging the crop material downstream so that the harvested crops are separated from impurities and discharged through the sieve-like outlet and the impurities are discharged through the downstream outlet.

2. The cleaning device of claim 1 and further including air restricting means associated with the sieve-like outlet for contributing to the generation of a dynamic pressure in the cleaning drum.

3. The cleaning device of claim 2 wherein the device for generating a dynamic pressure in the cleaning drum is an at least partially enclosed conveying means connected to the sieve-like outlet for receiving the cleaned harvested crops.

4. The cleaning device of claim 1 wherein the sieve-like outlet is circumferentially adjacent the air inlet.

5. The cleaning device of claim 1 wherein the rotational axis of the blower assembly is approximately parallel to the axis of the cleaning drum and the blower assembly substantially spans the axial extent of the cleaning drum.

6. The cleaning device of claim 1 wherein the sieve-like outlet extends axially and includes an upstream portion and a downstream portion and further including a separating member associated with the sieve-like outlet for segregating the flow of cleaned crop material entering the respective upstream and downstream portions.

7. The cleaning device of claim 1 and further including an auxiliary, at least partially foraminous, separating structure supported in the drum interior by the drum wall and at least partially overlying and being spaced radially inwardly from the sieve-like outlet.

8. The cleaning device of claim 7 wherein the auxiliary separating structure is, in terms of circumferential air flow direction, disposed in advance of the sieve-like outlet and includes a plurality of substantially parallel elongated fingers extending generally circumferentially and the means for urging crop material downstream includes the fingers being angled somewhat downstream.

9. The cleaning device of claim 8 wherein the fingers are axially spaced and the axial spacing is greater at the downstream end of the plurality of fingers than at the upstream end.

10. The cleaning device of claim 7 wherein the auxiliary separating structure approximately spans the axial extent of the sieve-like outlet.

11. The cleaning device of claim 1 and further including a plurality of circumferentially spaced auxiliary separating structures carried by the drum wall in the drum interior each such structure intercepting a portion of a crop material as it is propelled circumferentially adjacent the inner wall of the drum and deflecting it inwards away from the wall of the drum.

12. The cleaning device of claim 1 and further including means operatively associated with the air inlet for changing the direction of flow of air entering the drum relative to the tangential direction of the drum wall adjacent the air inlet.

13. The cleaning device of claim 1 and further including means carried by the drum wall inside the drum adjacent the sieve-like outlet for deflecting at least a portion of the crop material being propelled circumferentially around the wall of the drum inwards away from the wall of the drum.

14. The cleaning device of claim 1 and further including a second air inlet in the wall of the drum and a second blower assembly connected to the second air inlet for delivering a second flow of air into the drum in a direction approximately parallel to a tangent to the drum wall adjacent the air inlet.

15. The cleaning device of claim 1 wherein the connection of the blower assembly to the drum wall includes an axially extending arcuate wall member at least partially surrounding the drum wall and further including a second air inlet circumferentially spaced from the first, the outer wall member cooperating with the drum wall to define an air duct for delivery of air into the drum through the first and second air inlets.

16. The cleaning device of claim 15 and further including, carried by the drum wall in advance of each air inlet, an auxiliary, at least partially foraminous separating structure diverging inwardly from the drum wall so as to deflect inwards away from the wall at least a portion of the crop material being propelled circumferentially around the wall.

17. The cleaning device of claim 1 wherein the sieve-like outlet is disposed above the longitudinal axis of the drum.

18. The cleaning device of claim 1 wherein the feeder conveyor comprises a screw conveyor coaxial with the cleaning drum and an impeller coaxial with the conveyor and drum, for receiving at least a portion of the material from the screw conveyor and imparting an initial circumferential motion to the material entering the drum.

19. The cleaning device of claim 1 wherein the feeder conveyor includes a coaxial threshing and separating device at least partially axially overlapping the upstream portion of the cleaning drum.

20. The cleaning device of claim 1 wherein the upstream inlet for the delivery of crop material to the drum by the feeder conveyor is associated with the air inlet so that crop material is entrained in the air entering the drum.

21. The cleaning device of claim 1 wherein the blower assembly includes an inlet and said inlet is connected to the downstream end of the cleaning drum so that at least a portion of the air delivered by the blower assembly is drawn from the interior of the drum.

22. The cleaning device of claim 21 wherein the blower assembly is mounted coaxially with the cleaning drum at the downstream end of the drum.

23. The cleaning device of claim 1 wherein the wall of the cleaning drum includes a discharge outlet towards its downstream end for discharge of impurities separated from the harvested grain.

* * * * *